United States Patent [19]

Spalding

[11] 4,352,585
[45] Oct. 5, 1982

[54] DOOR OPERATOR SCREW COUPLING

[75] Inventor: Wilbur J. Spalding, Alliance, Ohio

[73] Assignee: The Alliance Manufacturing Company, Inc., Alliance, Ohio

[21] Appl. No.: 127,760

[22] Filed: Mar. 6, 1980

[51] Int. Cl.³ .............................................. E05F 11/00
[52] U.S. Cl. ..................................... 403/24; 403/341; 403/339; 49/199
[58] Field of Search ................ 403/341, 340, 339, 24; 49/199; 74/424.8 A

[56] References Cited

U.S. PATENT DOCUMENTS

| | | | |
|---|---|---|---|
| 1,013,036 | 12/1911 | McDonald et al. | 403/340 |
| 1,254,502 | 1/1918 | Hoppie | |
| 2,056,174 | 10/1936 | Earhuff et al. | |
| 2,636,727 | 4/1953 | Toth | 403/339 X |
| 2,944,810 | 7/1960 | Stuettig et al. | |
| 3,266,827 | 8/1966 | Whicker | 403/24 |
| 3,439,727 | 4/1969 | Perl | |
| 3,444,650 | 5/1969 | Flinchbaugh | |
| 3,469,345 | 9/1969 | Hanks | |
| 3,481,074 | 12/1969 | Moss | |
| 3,590,529 | 7/1971 | Purdy | |
| 3,965,792 | 6/1976 | King | 403/340 X |
| 4,050,191 | 9/1977 | Azuma | |
| 4,155,269 | 5/1979 | Lee et al. | 49/199 X |
| 4,241,540 | 12/1980 | Depperman | 49/199 |

FOREIGN PATENT DOCUMENTS 1101838 1/1968 United Kingdom ................ 403/341

OTHER PUBLICATIONS

Sears Roebuck & Co. Owners Manual on Garage Door Opener Model 139.663800, copy of two pages.

Primary Examiner—Andrew V. Kundrat
Attorney, Agent, or Firm—Pearne, Gordon, Sessions, McCoy & Granger

[57] ABSTRACT

A garage door operator is disclosed which has a motor-driven screw nearly enclosed within a guide, and a partial nut is guided by this guide means and moved longitudinally therealong by engagement with the rotating screw. The partial nut is adapted to be connected to a garage door to open and close the same. In order to shorten the package in which the garage door opener is shipped, the screw and guide means are in two or more parts and adapted to be coupled together to make an operative long screw and an operative long guide means. The screw parts, instead of being connected together at the factory by a double pivot connection, are shipped to the customer in a disconnected condition but one in which the coupling readily may be connected in a proper phase to avoid mismatch of the threads. The foregoing abstract is merely a resume of one general application, is not a complete discussion of all principles of operation or applications, and is not to be construed as a limitation on the scope of the claimed subject matter.

19 Claims, 6 Drawing Figures

U.S. Patent  Oct. 5, 1982  4,352,585
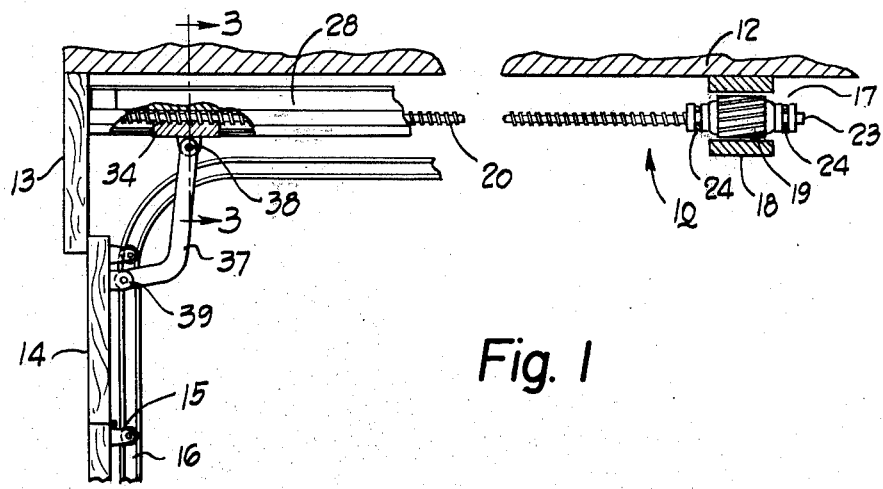
Fig. 1
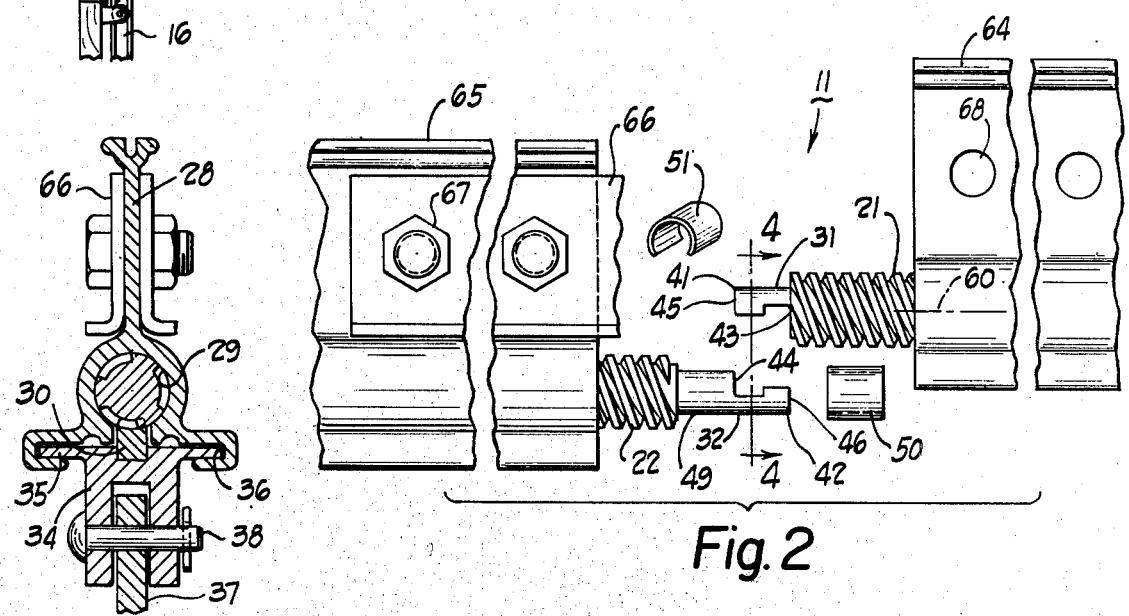
Fig. 2
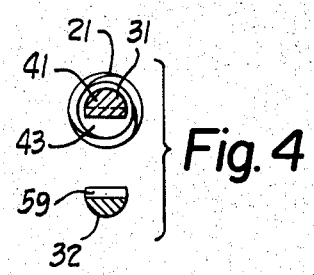
Fig. 3
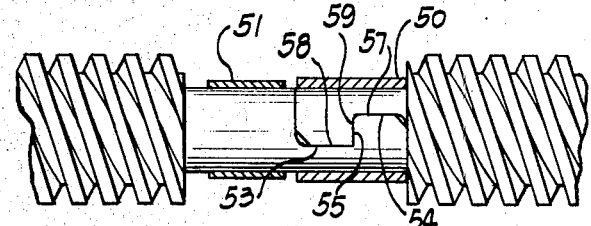
Fig. 4
Fig. 5
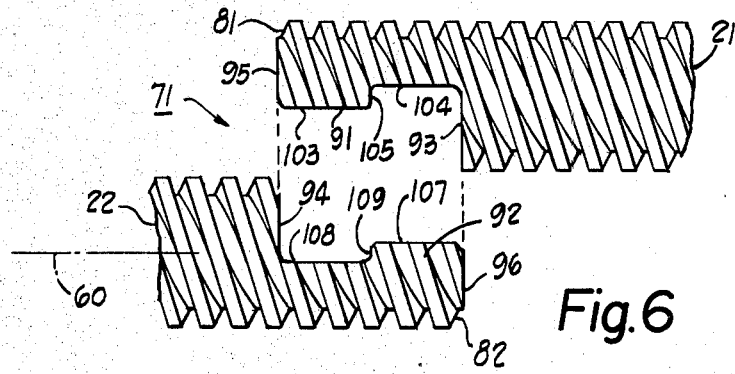
Fig. 6

DOOR OPERATOR SCREW COUPLING

BACKGROUND OF THE INVENTION

Garage door operators have been conceived and constructed for over 40 years. The concept of a longitudinally stationary but rotating screw to act on a traveling nut to open an overhead-type garage door was shown to be conceived nearly 45 years ago by U.S. Pat. No. 2,056,174. Cable-operated or chain-operated garage door operators have also been proposed, for example, as shown by U.S. Pat. Nos. 3,439,727 and 3,444,650. Typically, garage door operators are ones which have a traverse of the door operator mechanism of about eight or nine feet in order to accommodate the usual garage door plus the 90-degree angle through which the door turns. In the chain-type of garage door operator that has been manufactured, it has been customary for many years to shorten the package in which the door operator is shipped by cutting the guide channel into two or three parts which may be spliced together. Thus, the channel which was previously nine feet long now comprises three parts of about three feet in length. However, the screw drive door operators which have been marketed for many years have retained a one-piece screw and a one-piece guide means of about nine feet in length, which makes the package costs higher and, more importantly, makes the shipping and storage costs higher because the shipping charges are usually based upon the cubic volume rather than on the weight.

Recently, there has appeared on the market a screw drive garage door operator wherein the guide means is in two parts and the screw is in two parts and interconnected by coupling means which has an interconnecting link with a pivot pin at each end pivoted to the two screw parts. The guide means and screw parts are folded for shipment and then, upon installation, are straightened to be coaxial, and splice plates are bolted onto the sides of the guide means to maintain the coaxial alignment of the screw parts. A problem with such construction is the weakness of this coupling relative to the rest of the screw, the problem of providing a properly straightened guide means, and the problem of whipping of the screw during rotation which, because of two different pivot points, acts somewhat like a universal joint to whip around inside the guide means.

More importantly, the coupling for the two screw parts has so many different parts that the possible cumulative error in the tolerance of all these manufactured parts can make it possible that the threads on the two screw parts will be mismatched relative to the traversing partial nut, and thus the nut will fail to traverse this elongated coupling. Also, the very many parts in such coupling means and the necessary clearance between the parts in order to fold means that the coupling will tend to destroy itself upon repeated reversals of the screw. In practically all screw drive garage door openers, the motor reverses each time it is started, first driving the screw clockwise and then driving it counterclockwise in order that the nut traverses forward and then in reverse for closing and opening directions of the garage door. This continual reversing of torque through the coupling and the looseness or "play" in all the parts will tend to batter the coupling apart and make the clearance of the parts even greater, which will therefore create the great possibility of mismatch of the threads in the future during life of the operator, if they are not mismatched at the time of initial assembly.

SUMMARY OF THE INVENTION

This problem is solved by a garage door operator having a motor-driven screw at least partially within guide means, a partial nut guided by said guide means and movable longitudinally therealong by engagement with said screw and connectable to open and close the garage door, the screw being in at least first and second parts, and a coupling adapted to interconnect adjacent ends of the first and second screw parts, the improvement comprising said coupling being readily connectable and being disconnected at the time of shipment to the customer.

Accordingly, an object of the invention is to provide a door operator screw coupling with a minimum of parts, and hence with a minimum possible cumulative tolerance.

Another object of the invention is to provide a door operator screw coupling wherein the coupling includes first and second hermaphroditic parts which are mutually interengageable in only one possible way to preclude mismatch of the threads from the screw parts upon attempted traversal by the partial nut.

Another object of the invention is to provide a simple and effective door operator screw coupling with a long life and a good torque transmittal capability.

Other objects and a fuller understanding of the invention may be had by referring to the following description and claims, taken in conjunction with the accompanying drawing.

BRIEF DESCRIPTION OF THE DRAWING

FIG. 1 is a side elevational view, partly schematic, illustrating the invention;

FIG. 2 is an enlarged, side elevational view of the door operator screw coupling;

FIG. 3 is an enlarged, sectional view on line 3—3 of FIG. 1, to the same scale as FIG. 2;

FIG. 4 is a sectional view on line 4—4 of FIG. 2;

FIG. 5 is an enlarged, partial elevational view of the screw coupling of FIG. 2 assembled; and FIG. 6 is an enlarged, partial elevational view of a modified door operator screw coupling.

DESCRIPTION OF THE PREFERRED EMBODIMENTS

The drawing illustrates a garage door operator 10 which incorporates the screw coupling 11 of the invention. The garage door operator is intended to be installed within a garage having a ceiling 12 and a door header 13. The operator 10 may open and close almost any type of an enclosure, including slab doors, which can be pivoted or operate on a form of a track. However, a sectional door 14 is illustrated which has sections hinged together and provided with rollers 15 to roll on a track 16 between the closed position shown and an open position near the ceiling 12. The door operator 10 includes a motor 17 having a stator 18 and a rotor 19, rather schematically shown in FIG. 1. The motor 17 is connected to drive a screw 20 having first and second screw parts 21 and 22, respectively. The motor 17 has a shaft 23 connected to rotate the screw 20, and this shaft 23 has bearings, including thrust bearings 24, to absorb the longitudinal thrust in both directions on the screw 20.

The screw is mounted at least partially within guide means 28, and this guide means has a generally cylindrical bore 29 circumscribing about 300 degrees of the screw 20. In the remaining approximately 60 degrees of the periphery of the screw 20, a partial nut 30 is disposed, which nut has a length sufficient to bridge across the length of the screw coupling 11, which is formed of first and second coupling parts 31 and 32, respectively. The guide means 28 provides a guide not only for the screw 20, but also for the nut 30. A slide 34 has wings 35 slidably disposed in grooves 36 in the guide means 28, and this slide 34 carries the partial nut 30. A door arm 37 is pivotally connected at 38 to the slide 34, and at 39 to the door 14. Accordingly, as the motor 17 rotates the screw 20 in either a clockwise or counterclockwise direction, the partial nut 30, engaged with the screw 20, traverses the guide means 28 longitudinally to open or close the garage door 14.

The screw coupling 11 is better illustrated in FIGS. 2, 4, and 5, and the first and second coupling parts 31 and 32 are hermaphroditic parts wherein the first part 31 has a male extension 41 and a female shoulder 43, and the second coupling part 32 has a male extension 42 and a female shoulder 44. The male extension 41 has a male shoulder or forwardly facing shoulder 45, and similarly, the male extension 42 has a male shoulder or forwardly facing shoulder 46. In the embodiment of FIGS. 2, 4, and 5, the coupling parts 31 and 32, when interengaged as shown in FIG. 5, form a reduced diameter portion of the screw 20. The male extension 42 is extended from a reduced diameter portion 49 of the second screw part 22. It is reduced in diameter in order to accommodate the I.D. of a sleeve 50 and also to accommodate the I.D. of a C-clip 51. The male extension 41 is formed of a first flat portion 53 and a second flat portion 54 interconnected by a rear facing or proximal facing shoulder 55. Similarly, the male extension 42 is provided with a third flat portion 57 and a fourth flat portion 58 interconnected by a rear facing or proximal facing shoulder 59. In this preferred embodiment, the flat portions 53, 54, 57, and 58 are parallel to the axis 60 of the screw 20, and the shoulders 55 and 59 are perpendicular to this axis. The flat portion 53 is disposed on one side of the axis 60 approximately the same distance that the flat portion 54 is disposed on the other side of this axis.

The guide means 28 is provided in two parts 64 and 65, which are shown misaligned in FIG. 2 but may be aligned after the screw coupling 11 is interconnected, and then splice plates 66, only one of which is shown in FIG. 2, may be provided one on each side of the guide means 28 and fastened with bolts 67 extending through apertures 68 to secure together the two parts of the guide means 28 in alignment.

OPERATION

The garage door operator 10 is one which has the screw 20 in at least two parts 21 and 22, and the guide means 28 in at least two parts 64 and 65 during shipment. This is in order to reduce the overall length of the package in which the door operator is shipped. Since the shipping costs are based primarily on the cubic volume rather than the weight, the length of the package can be reduced to approximately half if the screw and guide are in two parts, or can be reduced to approximately one-third if the screw and guide are in three parts. This not only saves shipping charges, but saves storage charges, because door operators can be packed, shipped, and stored in a much smaller volume of space.

This is of benefit to the distributor as well as the dealer. It is also of benefit to the ultimate customer because the prior art system using an elongated screw of nine to ten feet in length, and a similar length package, could not be brought home in the trunk of an automobile by an ordinary purchaser. If the length is reduced to three and a half or five feet, however, then such transport by the ultimate user is greatly facilitated.

As shipped, the two parts of the screw 21 and 22 preferably extend outwardly from the respective parts 64 and 65 of the guide means, approximately as shown in FIG. 2. The sleeve 50 is first slipped over the male extension 42 onto the reduced diameter portion 49. The two screw coupling parts 31 and 32 are then disposed side-by-side and axially parallel about as shown in FIG. 2. Next, the guide parts 64 and 65 are moved to be coaxial to interengage the coupling parts 31 and 32. By such movement, the first flat portion 53 engages the fourth flat portion 58 and the second flat portion 54 engages the third flat portion 57. Next, the sleeve 50 may be slid to the right as viewed in FIG. 5, and the C-clip 51 transversely inserted over the reduced diameter portion 49. This prevents the sleeve 50 from moving to the left whereat it would not be covering the interengaged coupling parts 31 and 32.

Next, the guide parts 64 and 65 may be axially moved together, sliding over the screw 20, and then the splice plates 66 bolted in place, using the bolts 67 through the apertures 68. The door operator 10 may then be installed against the ceiling 12 and door header 13 in the usual manner, and connected to the door 14 to move it between open and closed positions.

FIG. 6

FIG. 6 shows a modified screw coupling 71 which may replace the screw coupling 11. This screw coupling 71 has first and second coupling parts 81 and 82, respectively, which are hermaphroditic parts in that the coupling part 81 includes a male extension 91 and a female shoulder 93, and the second coupling part 82 includes a male extension 92 and a female shoulder 94. A male shoulder 95 is provided on the end of the male extension 91 and a male shoulder 96 is provided on the end of the male extension 92. The first coupling part 81 is unitary with the first screw part 21, and the second coupling part 82 is unitary with the second screw part 22. These screw parts are again rotatably guided within the guide parts 64 and 65, respectively. In a manner similar to that in the first screw coupling 11, the first coupling part 81 is provided with first and second flat portions 103 and 104 interconnected by a rearwardly facing or proximal facing shoulder 105. Also, the second coupling part 82 is provided with a third flat portion 107 and a fourth flat portion 108 interconnected by a rearwardly facing or proximal facing shoulder 109. Just as in FIGS. 2 to 5, the flat portion 103 is disposed a small distance on one side of the axis 60 and the flat portion 104 is disposed substantially the same distance on the other side of this axis 60. The flat portions 103, 104, 107, and 108 are preferably parallel to the axis 60, and the shoulders 105 and 109, along with the shoulders 93–96, are substantially perpendicular to this axis.

OPERATION

The door operator 10, whether equipped with the screw coupling 11 or 71, is shipped in a collapsed condition, i.e., with the two screw parts 21 and 22 disposed side-by-side within the respective guide means 64 and 65. Upon unpacking, the user or the installer first positions the guide means 64 and 65 about as shown in FIG. 2. The screw part 21 can already be properly in working connection to the motor 17. In the position of FIG. 2 or 6, the axes of the two screw parts are parallel, but misaligned. Next, the two guide means 64 and 65 are relatively moved transversely to have the flat portion 103 engage the flat portion 108 and to have the flat portion 104 engage the flat portion 107. This interengages the screw coupling 71 and then the two guide parts 64 and 65 may be relatively axially moved together, sliding over the screw 20. With the screw part 21 in operative connection with the motor 17, this will mean that the guide part 65 slides to the right, while screw part 22 remains stationary until the guide part 65 abuts guide part 64. At this time, the splice plates 66 may be bolted in place, as in FIGS. 2 and 3. The door operator 10 may then be mounted to the ceiling 12 and door header 13 in the usual manner.

The screw couplings 11 and 71 of the present invention are ones where it is not possible to put the two screw parts together in incorrect phase. A triple thread screw has been illustrated in the figures, and in such case it is quite important that the phase of each of the two screw parts 21 and 22 at the coupling 11 or 71 be proper so that they are not mismatched relative to the partial nut 30, which will have to traverse this coupling once for each door opening or closing movement. Because the couplings 11 or 71 are hermaphroditic couplings, i.e., couplings which have partly male and partly female properties, it is impossible to put these couplings together in other than the correct manner. Still further, the way in which the two coupling parts interconnect minimizes the possible cumulative tolerance errors which are inherent in machining the coupling parts.

A two-piece screw for a garage door operator which is currently on the market utilizes a multipart coupling. This screw coupling has a fork on the two adjacent ends of the screws and then an intermediate link is pivoted at each end within these two forks. This makes a type of a universal joint connection so that the two pivot points are far enough apart that the screw may be folded back upon itself, while within the guide parts, without interference between the two guide parts. This makes a long screw coupling and one which has many parts, the cumulative tolerance of which may be excessive and may result in mismatch of the threads on the screw relative to the threads on the partial nut. The possible cumulative tolerance errors, in the longitudinal dimension, in such unit now on the market are: (1) the jig or fixture to hold the first screw at the correct axial position, (2) the diameter of the hole in the first fork, (3) the diameter of the hole in the first tongue, (4) the axial position of the hole in the first fork, (5) the dimension between the two pivot holes in the intermediate link, (6) the axial position of the hole in the second fork, (7) the diameter of the hole in the second tongue, (8) the diameter of the hole in the second fork, and (9) the jig or fixture to hold the second screw at the correct axial position. These are all things which will affect the axial dimension, and hence proper phase match, of the threads on the two screw parts relative to that on the nut. Additionally, there are other tolerances which affect the rotational position of one screw relative to the other, but these will be disregarded as being of lesser importance than the cumulative tolerance on the axial position. If each of the above nine dimensions is held to plus or minus 0.002 inch in tolerance, then this is a total of nine times 0.004 inch, or 0.036 inch possible cumulative tolerance. This is about half the width of the crest of the square thread on the screw. These screw drive door operators are ones which typically reverse the direction of rotation of the screw each time the motor is started. That means the screw will rotate clockwise, for example, for door opening, and counterclockwise for door closing. This continuous reversal of rotation means that first there is an axial compression force on the coupling and next an axial tension force on the coupling. This results in continual battering of the coupling so that the dimensional tolerances will increase from that occurring at the time of manufacture. The stress and shock on the coupling are perhaps worst in the initial acceleration from rest of a 200 or 300 pound door, to overcome the inertia of such door. Even if mismatch of the threads on the nut with that on the two screw parts does not occur at the time of manufacture, there is increasing likelihood that the screw threads will become mismatched sometime during use of the door operator.

The present invention teaches the structure of the screw coupling 11 or 71 which minimizes such possible cumulative tolerance error. In order to compare the present invention with the door operator existing on the market, the present invention has the following possible cumulative tolerance errors:

(1) the axial phase position of the end of the thread on the first screw part 21 to the female shoulder 43 or 93;
(2) the axial dimension of the flat portion 54 or 104;
(3) the axial dimension of the flat portion 53 or 103;
(4) the axial dimension of the flat portion 57 or 107;
(5) the axial dimension of the flat portion 58 or 108; and
(6) the axial dimension between the female shoulder 44 or 94 and the same phase position of the thread on the second screw part 22.

At first, this appears that there is only a 9:6 or 3:2 improvement in the possible cumulative tolerance error. However, it will be noted that the first and second coupling parts 31 and 32 or 81 and 82 interfit, and this eliminates two of the possible cumulative tolerance errors. For example, suppose that the length of the first flat portion 53 fits closely relative to the first or flat portion 58, and more closely than the two flat portions 54 and 57 interfit, then it will be the shoulders 44 and 45 which take the axial compression force rather than shoulders 43 and 46. Shoulders 55 and 59, of course, take the axial tension force. This means that it is only the possible tolerance error on the length of the first flat portion 53 which is of importance out of all of the four lengths of flat portions, plus the first and sixth on the list immediately above for a total of three possible tolerance dimensions. If each of these is established at plus or minus 0.002 inch, as in the example given above, then this will be three times 0.004 inch, or 0.012 inch possible cumulative tolerance. This is three times better than the unit currently on the market, and shows the advantage of the hermaphroditic interfitting coupling 11 or 71.

The coupling 11 shown in FIGS. 2 to 5 incorporates the sleeve 50, which is closely received on the two interfitting male extensions 41 and 42. This sleeve 50, then, helps absorb the clockwise or counterclockwise torque transmitted by the first screw part 21 to the second screw part 22. The load of the door 14 on the motor 17, and especially the starting and stopping acceleration and deceleration forces, tend to split apart the two coupling parts 31 and 32. The sleeve 50 may be a hardened steel sleeve to resist such torque-caused separation. In the screw coupling 71, there is the same type of torque-caused tendency to spread apart the two coupling parts 81 and 82. In this design, this tendency is resisted by the guide means 28, which, in the preferred embodiment, is a heavy-walled aluminum extrusion circumscribing about 300 degrees of the periphery of the screw 20. The screw coupling 71 has the advantage of threads along the entire outer periphery of the coupling, so that the partial nut rides easily along the matched threads at this coupling. In the screw coupling 11 of FIGS. 2 to 5, the length of the coupling 11 between threads, assembled as shown in FIG. 5, is only about 0.75 inch, including the reduced diameter portion 49, for a pitch diameter of the screw of about 0.5 inch, and the partial nut may have a length of about 2.6 inches in a typical door operator, so such partial nut easily spans this 0.75 inch screw coupling 11 whereat there are no external threads. Of course, the reduced diameter portion 49 is reduced to a diameter to permit the sleeve 50 to be mounted yet to have the outside diameter thereof below the root diameter of the thread forms on the screw 20.

The above descriptions of the screw couplings 11 or 71 show a coupling which is readily connectible by the user or installer, yet it is disconnected at the time of shipment to the ultimate customer. Phase means are provided so that the couplings are mutually interengageable in only one possible manner, and this precludes interconnecting these screw parts in an incorrect phase of the threads on the screw parts. The phase means is provided by the hermaphroditic style of coupling. The interconnecting male and female shoulders 44 and 45, for example, provide direct transfer of longitudinal compression force therebetween. This eliminates any whipping action which may be caused by the double pivoted screw coupling of the prior marketed unit. The interconnected rearwardly facing shoulders 55 and 59, or 105 and 109, directly transmit longitudinal tension forces therebetween, which would be the case for door opening movement. The two couplings 11 and 71 illustrate ways in which a part of the first screw directly engages a part of the second screw for directly transmitting torque both clockwise and counterclockwise between the screw parts.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a garage door operator having a motor-driven screw at least partially within guide means, a partial nut guided by said guide means and movable longitudinally therealong by engagement with said screw and connectable to open and close the garage door, the screw being in at least first and second parts, and a coupling adapted to interconnect adjacent ends of the first and second screw parts, the improvement comprising said coupling being readily connectable and being disconnected at the time of shipment to the customer said coupling in the connected condition being capable of being traversed by the partial nut, the first screw part having a portion adapted to abut and directly transmit torque both clockwise and counterclockwise to the second screw part.

2. A screw coupling as set forth in claim 1, including a male extension on the first screw part with a proximal facing shoulder,
    a male extension on the second screw part with a proximal facing shoulder, and
    said two shoulders being interengageable with the two screw parts disposed coaxially to transmit longitudinal tension force therebetween.

3. A screw coupling as set forth in claim 1, including a forward-facing and a rearward-facing shoulder on each screw part,
    said two rearward-facing shoulders being interengageable with the two screw parts disposed coaxially to transmit longitudinal tension force therebetween, and
    said two forward-facing shoulders being interengageable with the two screw parts disposed coaxially to transmit longitudinal compression force therebetween.

4. A screw coupling as set forth in claim 1, including first and second portions on the first screw part disposed in that order from the end thereof,
    third and fourth portions on the second screw part disposed in that order from the end thereof,
    said second and fourth portions having a thinner transverse dimension than said first and third portions, respectively, and
    said first and second portions being those portions adapted to abut and transmit torque to the second screw part.

5. A screw coupling as set forth in claim 4, wherein said first through fourth portions are substantially flat planes.

6. A screw coupling as set forth in claim 1, including phase means in said coupling to preclude connecting said coupling in the incorrect phase which would result in a mismatch of the thread on the screw parts as traversed by the partial nut.

7. A door operator screw coupling as set forth in claim 1, wherein said coupling includes first and second hermaphroditic parts unitary with the first and second screw parts, respectively, and mutually interengageable in only one possible way to preclude interconnecting the screw parts in an incorrect phase of the threads on the screw parts.

8. A screw coupling as set forth in claim 7, wherein said first coupling part has male and female shoulders,
    said second coupling part has male and female shoulders, and
    at least one of a pair of male and female shoulders is interengageable for direct transfer of longitudinal compression force therebetween.

9. A screw coupling as set forth in claim 7, including first and second portions on said first coupling parts disposed in that order from the end thereof,
    third and fourth portions on said second coupling part disposed in that order from the end thereof, and
    said second and fourth portions having a thinner transverse dimension than said first and third portions, respectively.

10. A screw coupling as set forth in claim 9, including a first proximal-facing shoulder on said first coupling part between said first and second portions, and a second proximal-facing shoulder on said second coupling part between said third and fourth portions.

11. A screw coupling as set forth in claim 10, wherein said first and second shoulders are adapted to be abutting with the screw parts coaxial to transmit longitudinal tension forces through said coupling.

12. A screw coupling as set forth in claim 10, wherein said first through fourth portions are disposed substantially parallel to the screw axis.

13. A screw coupling as set forth in claim 9, wherein said first and second coupling parts may be interengaged with the two screw parts coaxial to establish said second and third portions adjacent each other and said first and fourth portions adjacent each other for transmission of clockwise and counterclockwise torque through said coupling.

14. A screw coupling as set forth in claim 13, wherein the thread on the two screw parts is substantially continuous along the interengaged coupling.

15. In a garage door operator having a motor-driven screw at least partially within guide means, a partial nut guided by said guide means and movable longitudinally therealong by engagement with said screw and connectable to open and close the garage door, the screw being in at least first and second parts, and a coupling adapted to interconnect adjacent ends of the first and second screw parts, the improvement comprising:

said coupling being readily connectable and being disconnected at the time of shipment to the customer;

first and second hermaphroditic parts unitary with the first and second screw parts, respectively, and mutually interengageable in only one possible way to preclude interconnecting the screw parts in an incorrect phase of the threads on the screw parts;

first and second portions on said first coupling parts disposed in that order from the end thereof;

third and fourth portions on said second coupling part disposed in that order from the end thereof;

said second and fourth portions having a thinner transverse dimension than said first and third portions, respectively;

said first and second coupling parts being interengageable with the two screw parts coaxial to establish said second and third portions adjacent each other and said first and fourth portions adjacent each other for transmission of clockwise and counterclockwise torque through said coupling; and said first and second coupling parts in the interengaged condition having a substantially circular cross section and having a diameter reduced to less than the root diameter of the screw.

16. A screw coupling as set forth in claim 15, including a sleeve closely surrounding said reduced diameter.

17. A screw coupling as set forth in claim 16, including a longitudinally extended reduced diameter portion on one of said screw parts to accommodate said sleeve in a position remote from said coupling.

18. A screw coupling as set forth in claim 17, including a spring clip engageable with said extended reduced diameter portion to inhibit longitudinal movement of said sleeve.

19. A screw coupling as set forth in claim 1, wherein a multiple start thread is provided on the first and second screw parts.

* * * * *

UNITED STATES PATENT AND TRADEMARK OFFICE
CERTIFICATE OF CORRECTION

PATENT NO. : 4,352,585
DATED : October 5, 1982
INVENTOR(S) : Wilbur J. Spalding

It is certified that error appears in the above—identified patent and that said Letters Patent is hereby corrected as shown below:

Claim 1, column 8, line 1, delete "about" and insert --abut--.

Signed and Sealed this

Twenty-eighth Day of December 1982

[SEAL]

Attest:

GERALD J. MOSSINGHOFF

Attesting Officer

Commissioner of Patents and Trademarks